United States Patent [19]
Szabo

[11] Patent Number: 5,378,025
[45] Date of Patent: Jan. 3, 1995

[54] QUICK CONNECTOR WITH INTEGRAL RELEASE MEMBER

[75] Inventor: George Szabo, Ortonville, Mich.

[73] Assignee: ITT Corporation, New York, N.Y.

[21] Appl. No.: 147,059

[22] Filed: Nov. 3, 1993

[51] Int. Cl.6 .................................... F16L 39/04
[52] U.S. Cl. ........................ 285/39; 285/319; 285/921
[58] Field of Search ............. 285/39, 319, 315, 921, 285/308

[56] References Cited

U.S. PATENT DOCUMENTS

| | | |
|---|---|---|
| 4,293,149 | 10/1981 | Bonel ........................ 285/319 X |
| 4,781,400 | 11/1988 | Cunningham . |
| 4,793,637 | 12/1988 | Laipply et al. . |
| 5,056,756 | 10/1991 | Norkey et al. . |
| 5,084,954 | 2/1992 | Klinger . |
| 5,161,833 | 11/1992 | McNaughton et al. . |
| 5,161,834 | 11/1992 | Norkey . |
| 5,172,940 | 12/1992 | Usui et al. ................. 285/319 X |
| 5,187,851 | 2/1993 | Klinger . |
| 5,213,376 | 5/1993 | Szabo . |
| 5,226,230 | 7/1993 | Klinger . |
| 5,228,728 | 7/1993 | McNaughton et al. . |
| 5,267,757 | 12/1993 | Dal Palù ................... 285/319 X |
| 5,303,963 | 4/1994 | McNaughton et al. ...... 285/319 |

FOREIGN PATENT DOCUMENTS 2205136 11/1988 United Kingdom ............. 285/319
9104435 4/1991 WIPO ........................... 285/308

Primary Examiner—Randolph A. Reese
Assistant Examiner—Heather Chun Shackelford
Attorney, Agent, or Firm—Robert P. Seitter; J. Gordon Lewis

[57] ABSTRACT

A release member for a quick-type connector includes an outer sleeve concentrically disposed about an inner sleeve and integrally joined to the inner sleeve at one end. A plurality of circumferentially spaced fingers are formed on the inner sleeve and extend axially from an opposite end of the inner sleeve. Radially outward extending projections are formed on the inner sleeve and engage an inward extending flange on a female connector part to retain the release member in the open end of a bore in the female connector part, with the outer sleeve slidably disposed over the tubular end portion of the female connector part. Engaging surfaces formed between the fingers on the inner sleeve engage deflectable legs on a retainer mounted in the bore of the female connector part when the release member is forcibly urged into the bore in the female connector part to deflect the legs radially outward so as to permit separation of a radially expanded flange on a male conduit from the female connector part.

15 Claims, 2 Drawing Sheets

QUICK CONNECTOR WITH INTEGRAL RELEASE MEMBER

BACKGROUND OF THE INVENTION

Field of the Invention

The present Invention relates, in general, to snap-fit connectors and, more particularly, to quick connectors employed in fluid conduit systems to facilitate assembly and disassembly of fluid components.

Quick connectors have long been used to facilitate the assembly and disassembly of mechanical devices. This is particularly true in complex automotive systems wherein numerous fluid conduit interconnections are required.

In such connectors, a retainer is typically mounted within a female connector part or fitting in a relatively inaccessible position to lock a male member or conduit inserted into a female connector part or fitting. In order to separate the male conduit from the female connector, it is necessary to expand the deflectable legs on the retainer in a radially outward direction to enable an enlarged, annular abutment surface typically formed on the male conduit to pass by the ends of the legs and be removed from the female connector. Tools are frequently employed to effect the release of quick connect fittings by deflecting the retainer legs as shown in U.S. Pat. Nos. 5,084,954; 5,187,851 and 5,226,230.

Certain quick connector designs have a release member slidably mounted on the male fitting component as shown in U.S. Pat. Nos. 4,793,637; 5,056,756; 5,161,834; and 5,228,728. Such release members are slidable into the female connector part to engage and radially expand the deflectable legs of the retainer member mounted in the female connector part to enable the enlarged annular flange on the male conduit to be easily removed from the female connector.

However, in certain applications, the quick connector is located in a relatively inaccessible position and is closely surrounded by other components which make the use of a separate tool to separate the male conduit from the female connector component relatively difficult if not impossible due to limited available space. Such limited space factors also make the quick connectors employing a slidable release member on one of the components difficult to disassemble. In the aforementioned quick connector designs employing slidable release members mounted on the male conduit of the quick connector fitting, the release member typically has an enlarged end flange which is grasped by a user to slide the release member into the female component to effect separation of the male conduit from the female component. However, the enlarged head is typically of the same or even a smaller diameter than the tubular end of the female component thereby providing a relatively small user engageable surface. The aforementioned limited space considerations typically encountered in automotive applications makes it difficult for a user to easily grasp the head of the release member.

What is needed is a quick connector having an integral release means mounted thereon which is easy to grasp and operate, even in limited space applications. It would be desirable to provide a quick connector having an integral release means which does not require additional, separate release components. It would also be desirable to provide a quick connector which permits easy grasping and operation of the release means formed thereon. Finally, it would be desirable to provide a quick connector with integral release means which is easily operable even in tight or limited space applications.

SUMMARY OF THE INVENTION

The present invention is a quick-type connector having a unique integral release means which enables separation of a male member or conduit from a retainer mounted in a bore in a female connector part of the quick-type connector.

The release means preferably includes an inner tubular sleeve having a through bore extending therethrough. Means are formed on the inner sleeve and coact with the housing of the female connector part to retain the release means in the bore in the housing. An outer sleeve is integrally joined to one end of the inner sleeve and extends concentrically over the inner sleeve from the one end. The outer sleeve is disposed externally of a tubular end of the housing of the female connector part when the release means is mounted in the housing. The outer sleeve has a finger manipulatable surface formed exteriorly thereon. At least one retainer leg engaging surface is formed on the inner sleeve to engage the deflectable legs of a retainer mounted in the bore of the female connector part upon axial inward movement of the release means into the bore to deform the deflectable legs radially outward a sufficient distance to enable separation of a radially expanded flange on the male member or conduit from the retainer member in the female connector part.

A plurality of axial slots extend from one end to an opposite end of the outer sleeve and divide the outer sleeve into a plurality of circumferential spaced portions, each integrally joined at one end to the inner sleeve.

The release means further comprises a plurality of fingers extending axially from one end of the inner sleeve and slidably disposed between adjacent deflectable legs of the retainer mounted in the bore of the female connector part.

The means for retaining the release means in the housing of the female connector part preferably comprises a plurality of radially extending projections formed on the inner sleeve and extending outward toward the outer sleeve. The projections extend radially outward a distance greater than the inner diameter of the open end of the bore in the female connector part to engage an inward extending flange formed on the end of the female connector part. Preferably, the slots in the outer sleeve are circumferentially aligned with the fingers and the projections on the inner sleeve.

The release means of the present invention provides an easily grippable and manipulatable surface which enables a user to easily grasp and urge the release means into the bore in the female connector part to permit separation of the male conduit from the female connector part even in crowded or limited space conditions. The present release means eliminates the need for a separate release tool as employed in certain previous quick connector designs. Further, the release means is non-releasibly connected to the female connector component thereby eliminating the need for a separate release member slidably mounted on the male conduit as in certain other prior art quick connector designs. This enables the release means and the female connector part to be constructed as a single unit to thereby reduce the number of separate components required in the quick connector. Further, once the release means is mounted in the female connector part of the quick-type connector, it remains secured to the female connector part so as to prevent any inadvertent loss or separation therefrom.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
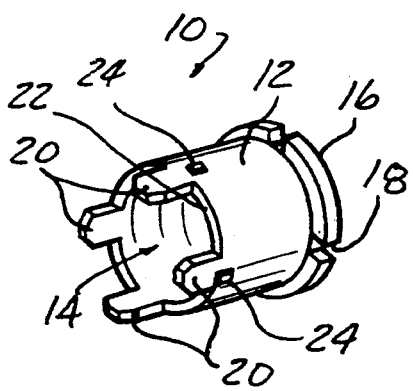
FIG. 1 is a perspective view of a prior art release member employed in a quick-type connector.

Referring now to the drawing, and to FIG. 1 in particular, there is depicted a prior art release member 10 similar to the release members shown in U.S. Pat. Nos. 5,056,756 and 5,161,834. The release member 10 includes a cylindrical tubular body 12 having a through bore 14 extending therethrough. An enlarged end flange 16 is formed at one end of the tubular body 12 and extends radially outward therefrom. A plurality of slots 18 are formed in the end flange 16.

A plurality of axially extending fingers 20 project from the opposite end of the tubular body 12 and are adapted to slide between the deflectable legs of a retaining member typically employed in quick-type connectors. Retainer engaging surfaces 22 are formed on one end of the tubular body 12 in between the axially extending fingers 20. The surfaces 22 engage the deflectable legs of the retainer member in a female connector part when the tubular body 12 is slidably urged into the female connector part and cause the deflectable legs of the retainer to expand radially outward to enable an enlarged annular flange formed on a male conduit to be easily slid past the retaining member and be separated from the female connector part. Lock projections 24 are formed on the exterior surface of the tubular body 12 for engaging a rolled-in end flange on the female connector part to retain the tubular body 12 within the female connector part.

Figure 2:
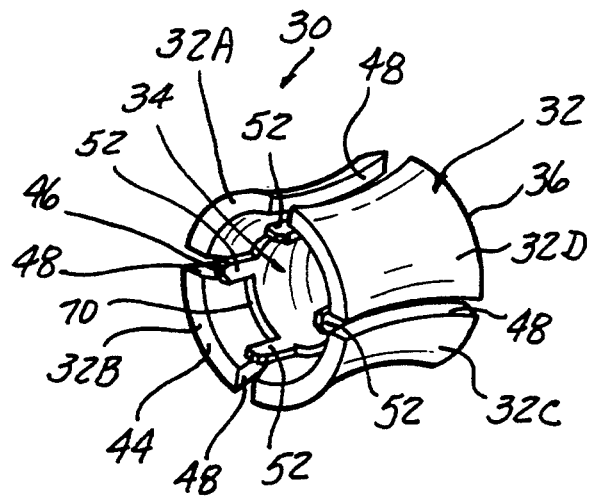
FIG. 2 is a perspective view of an integral release member of the present invention.
Figure 3:
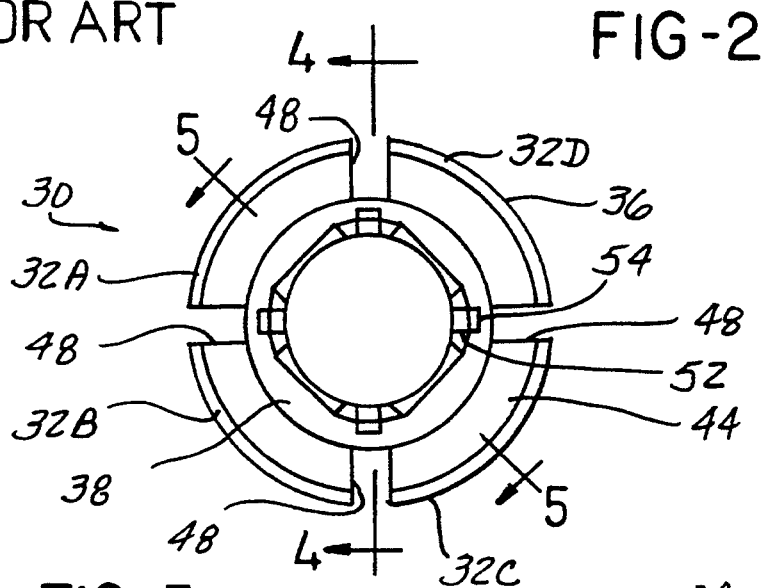
FIG. 3 is a left-hand end view of the release member shown in FIG. 2.
Figure 4:
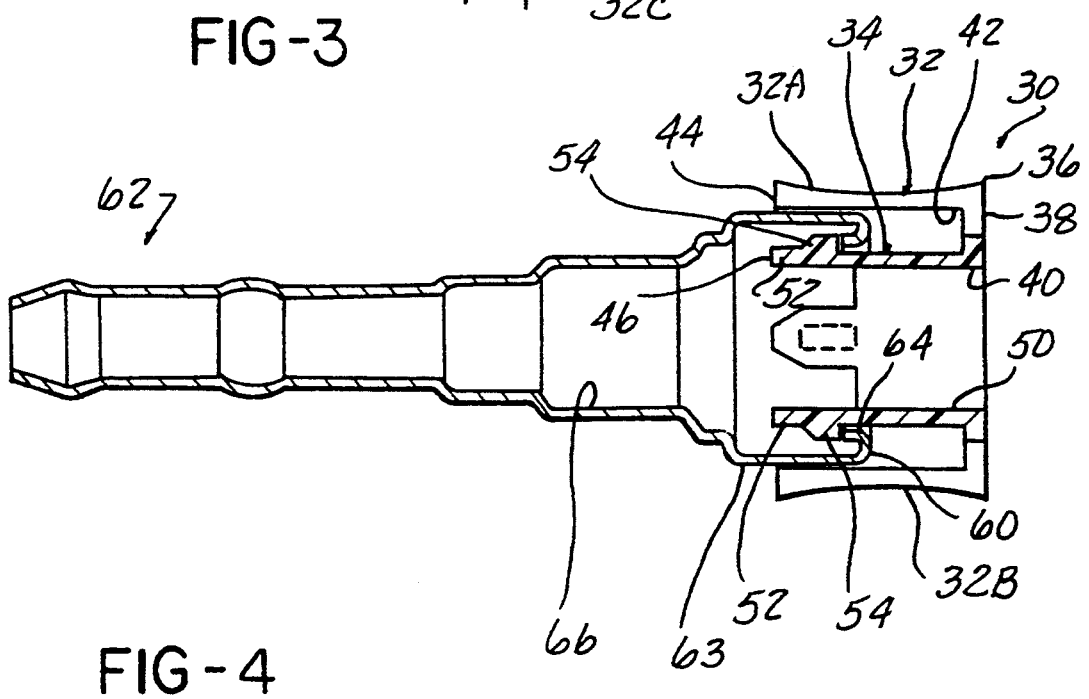
FIG. 4 is a longitudinal cross section of a female connector part employed in a quick connector showing the mounting of the release member depicted in FIG. 2 thereon.

Referring now to FIGS. 2, 3 and 4, there is depicted a release means 30 constructed in accordance with the teachings of the present invention which is employed with a quick-type connector to effect disassembly of the mating components of the connector. The release means or member 30 is in the form of a tubular body constructed of a suitable material, such as plastic. The tubular body is formed with an outer sleeve denoted generally by reference number 32 which is integrally joined, such as by molding, at one end to a concentrically disposed inner sleeve 34. Thus, a first end 36 of the outer sleeve 32 is integrally connected by a short annular wall 38 to a first end 40 of the inner sleeve 34. The remainder of the axial length of the outer sleeve 32 is spaced from the inner sleeve 34 by an annular recess 42 such that a second end 44 of the outer sleeve 32 is spaced from the corresponding second end 46 of the inner sleeve 34. The outer sleeve 32 slidingly contacts an exterior surface 63 formed on the end of a female connector part 62, as described hereafter.

A plurality of circumferentially spaced slots 48 are formed in the outer sleeve 32 and extend from a closed end adjacent the first end 36 of the outer sleeve 32 to an open end at the second end 44 of the outer sleeve 32. Preferably the slots 48 are spaced 90° apart and form four, circumferentially spaced outer sleeve sections 32A, 32B, 32C and 32D.

Each outer sleeve section 32A, 32B, 32C and 32D is formed with a suitable user engageable and manipulatable surface to facilitate easy grasping and sliding of the release member 30, as described hereafter. In one preferred embodiment, each outer sleeve section 32A, 32B, 32C and 32D is formed with an arcuate, recessed surface between the first end 36 and the second end 44 thereof. It should be understood that other suitable grasping surfaces, such as by use of knurling, textured surfaces, etc., may also be employed.

The inner sleeve 34 has a generally cylindrical tubular body portion which surrounds a through bore 50 which extends from the first end 40 to the second end 46 thereof. The diameter of the bore 50 is selected so as to slidably receive a male conduit therethrough, as described hereafter.

At least one and preferably a plurality, i.e., four, circumferentially spaced, axially extending fingers, each denoted by reference number 52, are formed on and extend axially from the tubular body portion of the inner sleeve 34 to the second end 46 of the inner sleeve 34. Each of the fingers 52 terminates at the second end 46 substantially in line with the second end 44 of the outer sleeve 32. It will be understood that the number and circumferential spacing of the fingers 52 may be varied depending upon the number of deflectable legs employed in a retainer member mounted in a female connector part, as described hereafter. The fingers 52 slidably extend between adjacent, circumferentially spaced legs of the retainer member to correctly orient the release member 30 with respect to the retainer member.

A plurality of lock projections 54 are formed on the inner sleeve 34 and are circumferentially spaced about the inner sleeve 34. By way of example only, four projections 54 are formed on and extend radially outward from the exterior surface of the tubular body portion of the inner sleeve 34 toward the outer sleeve 32, as shown in FIGS. 3 and 4. Preferably, four projections 54 are employed in the present embodiment, with each projection 54 axially aligned with one of the fingers 52 on the inner sleeve 34. Further, the projections 54 are arranged in diametrically opposed pairs about the inner sleeve 34. The outer diameter of two opposed projections 54 is selected to be greater than the inside diameter of an inwardly extending or rolled-in flange 60 formed at one end of the female connector part 62 as shown in FIG. 4. After the release member 30 is forced into an open end 64 of the female connector part 62 past the inward extending flange 60, the projections 54 engage the inner edge of the flange 60 to prevent the separation of the release member 30 from the female connector part 62 thereby holding or retaining the release member 30 in the open end 64 of the female connector component 62. At the same time, the release member 30 is capable of a small amount of axial inward sliding movement toward a stepped bore 66 formed in the female connector part 62 and extending axially from the open end 64 thereof. As the female connector part 62 is conventional in quick-type connectors, further details pertaining to the construction of the female connector part 62 as well as standard sealing elements, such as O-rings, spacers, bearings or top hats, also typically employed in quick-type connectors, are not described or illustrated in the drawing for reasons of clarity. Details of such components can be had by referring to U.S. Pat. No. 5,213,376, the pertinent portions of which are incorporated herein by reference.

Figure 5:
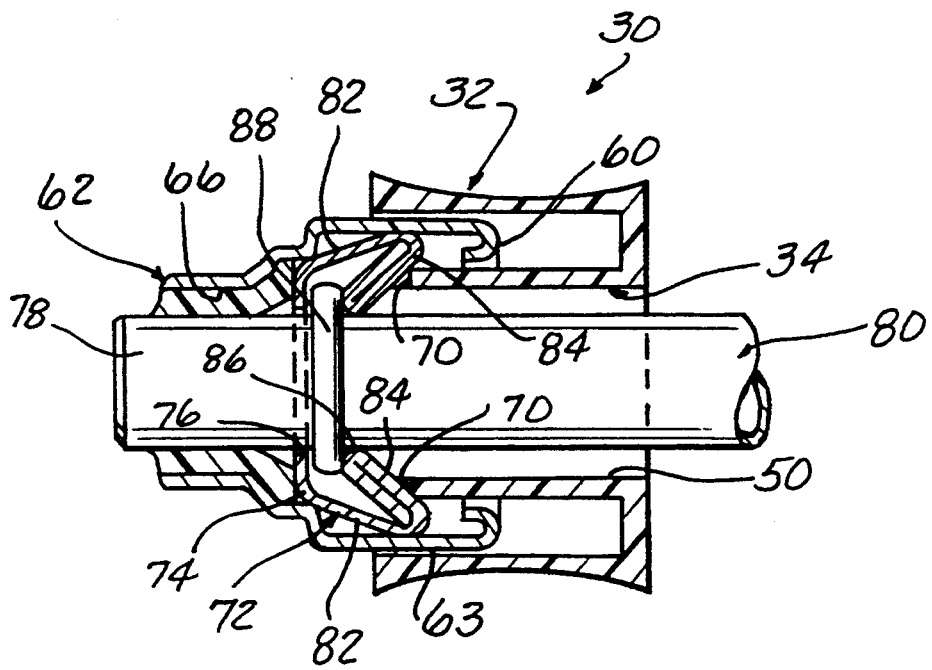
FIG. 5 is a partial, cross sectional view, showing the position of the various components of the quick connector and the release member in their normal position when a male conduit is coupled to the female connector part.
Figure 6:
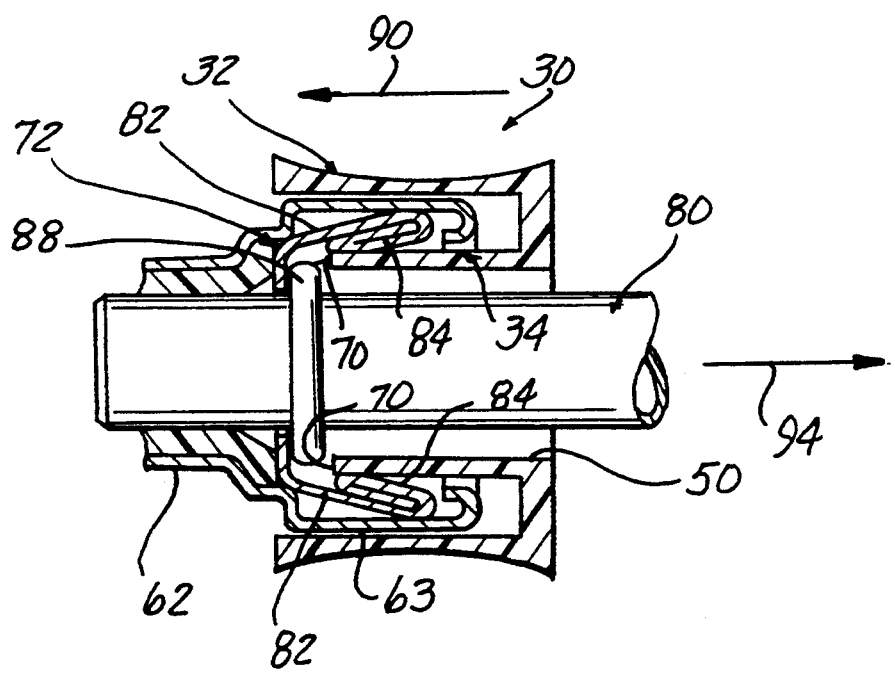
FIG. 6 is a partial, cross sectional view showing the position of the components in a conduit release position.

As shown in FIGS. 2, 5 and 6, retainer engaging surfaces 70 are formed on one end of the tubular body portion of the inner sleeve 34 between the fingers 52. The surfaces 70 are circumferentially oriented so as to engage the deflectable legs of a retainer member mounted in the female connector component 62. As shown in FIGS. 5 and 6, an annular retainer member denoted generally by reference number 72 is mounted in the stepped bore 66 in the female connector component 62. As is conventional, the retainer member 72 has an annular base 74 with a centrally located aperture 76 having a diameter to slidably receive a first end 78 of a male connector component or conduit 80 therein. A plurality of angularly disposed legs 82 project radially and axially outward from the base 74 and terminate in rolled over deflectable legs 84 which project radially and angularly inward from the outer ends of the angular legs 82 toward the base 74 of the retainer member 72. The outer end 86 of each of the deflectable legs 84 is spaced from the annular base 74 by a distance sized to receive an annular upset or flange 88 formed on the male conduit 80 and spaced from a first end 78 thereof. In this manner, the male conduit 80 may be slidably inserted into the open end 64 of the female connector component with the annular upset flange 88 forcing the deflectable legs 84 radially outward until the annular flange 88 seats in the gap adjacent the base 74 of the retainer means 72. When the annular flange 88 is in this position, as shown in FIG. 5, the deflectable legs 84 snap back to their normal position and engage one side of the annular flange 88 to forcibly retain the male conduit 80 in the female connector part 62 in a normal manner.

With the male component 80 seated within the female connector part 62, as shown in FIG. 5, the legs 52 (FIG. 4) on the inner sleeve 34 of the release member 30 are disposed between adjacent deflectable legs 84 of the retainer member 72. The surfaces 70 on the inner sleeve 34 are disposed adjacent to the deflectable legs 84 as also shown in FIG. 5. Further, the outer sleeve 32 in its normal mounting position is disposed adjacent to or slidably engaged with the exterior surface 63 of the tubular end of the female connector part 62.

When it is desired to separate the male conduit 80 from the female connector part 62, the release means 30 is grasped by a user by placing his fingers about the exterior surface of the outer sleeve 32 and forcibly urged in the direction of arrow 90, as shown in FIG. 6, into the female connector part 62. During this sliding movement, the surfaces 70 on the inner sleeve 34 forcibly engage the deflectable legs 84 of the retainer 72 and force the deflectable legs 84 radially outward to the position shown in FIG. 6 in which the distance between inner surfaces of each pair of deflectable legs 84 is greater than the outer diameter of the annular flange 88 on the male conduit 80 permitting easy sliding withdrawal or separation of the male component from the female connector part 62 in the direction of arrow 94. The release member 90 then automatically moves by the spring force of the legs 82 and 84 in a direction opposite from that shown by arrow 90 to enable the deflectable legs 84 to return to their normal position for the next insertion of the male conduit 80 therein.

In summary, there has been disclosed a unique quick-type connector having an integral release means mounted thereon. The integral release means is formed as an integral one-piece member and is securely mounted on the female connector part of the quick-type connector so as to be constantly present on the female connector part without loss or inadvertent separation therefrom. The release means is formed with an easily graspable and manipulatable exterior surface which facilitates easy sliding movement of the release member to effect disassembly of the male and female components of the quick-type connector. Further, the integral design of the release means enables the release means to be easily grasped and manipulated by a user even in limited space conditions which would prevent the use of separate prior art release tools or previously devised release members mounted on the male component of the connector. Finally, the release means of the present invention is simple in construction and, due to its integral construction, reduces the number of separate components used in a quick-type connector.

What is claimed is:

1. A release member for a fluid connector formed of a housing having a bore opening through a tubular end of the housing, a retainer with at least one deflectable leg mounted in the bore and engaging a radial abutment surface on a male connector part insertable into the bore to retain the male connector part in the housing, the release member comprising:

an inner tubular sleeve having one end and an opposite end and also having a through bore extending therethrough;

means, formed on the inner sleeve and coacting with the housing, for retaining the release member in the bore in the housing;

an outer sleeve integrally joined to the one end of the inner sleeve and extending concentrically thereover, the outer sleeve disposed externally of the tubular end of the housing when the release member is mounted in the housing and having an external finger gripping surface formed thereon; and at least one retainer leg engaging surface formed on the inner sleeve and engagable with a deflectable retainer leg upon axial movement of the release member into the bore in the housing to radially outwardly deform the at least one deflectable leg a sufficient distance to enable the radial abutment surface on the male connector part to be disengaged from the retainer member and separated from the housing.

2. The release member of claim 1 further comprising:

a plurality of slots extending axially from the one end to an opposite end of the outer sleeve and dividing the outer sleeve in a plurality of circumferentially spaced outer sleeve sections, each integrally joined at the one end to the inner sleeve.

3. The release member of claim 1 further comprising:
a plurality of fingers axially extending from the opposite end of the inner sleeve.

4. The release member of claim 1 wherein the means for retaining the release member in the housing comprises:
a plurality of radially outward extending, circumferentially spaced projections formed on the inner sleeve, the projections extending radially outward a distance greater than a diameter of the open end of the bore in the housing.

5. The release member of claim 4 further comprising:
a plurality of slots extending axially from the one end to the opposite end of the outer sleeve and dividing the outer sleeve in a plurality of circumferentially spaced outer sleeve sections, each integrally joined at the one end to the inner sleeve.

6. The release member of claim 5 further comprising:
a plurality of fingers axially extending from the opposite end of the inner sleeve;
the slots in the outer sleeve axially aligned with the fingers on the inner sleeve.

7. The release member of claim 1 wherein:
the exterior surface of the outer sleeve has an arcuate finger engageable recessed shape.

8. A release member for a fluid connector formed of a housing having a bore opening through a tubular end of the housing, a retainer with a plurality of deflectable legs mounted in the bore and engaging a radial abutment surface on a male connector part insertable into the bore to retain the male connector part in the housing, the release member comprising:
an inner tubular sleeve having a through bore extending therethrough;
a plurality of fingers axially extending from one end of the inner sleeve;
a plurality of radially extending, circumferentially spaced projections formed on the inner sleeve, the projections extending radially outward for a distance such that an outer diameter between two opposed projections is greater than a diameter of the open end of the bore in the housing;
an outer sleeve integrally joined to an end of the inner sleeve and extending concentrically thereover, the outer sleeve disposed externally of the tubular end of the housing when the release member is mounted in the housing and having an external finger gripping surface formed thereon; and
a plurality of retainer leg engaging surfaces formed on the inner sleeve, each engagable with a deflectable retainer leg upon axial movement of the release member into the tubular end of the housing to radially outwardly deform each deflectable leg a sufficient distance to enable the radial abutment surface on the male connector part to be disengaged from the retainer member and separated from the housing.

9. The release member of claim 8 further comprising:
a plurality of slots extending axially from an end to the one end of the outer sleeve and dividing the outer sleeve in a plurality of circumferentially spaced outer sleeve sections, each integrally joined at an end to the inner sleeve.

10. The release member of claim 9 wherein:
the slots in the outer sleeve are axially aligned with the fingers on the inner sleeve.

11. The release member of claim 8 wherein:
the exterior surface of the outer sleeve has an arcuate finger engageable recessed shape.

12. A quick type fluid connector comprising:
a housing having a tubular end and a bore extending therethrough from an open end of the housing;
a conduit insertable into the bore, the conduit having a radially outward extending annular flange spaced from one end thereof;
a retainer mounted in the bore in the housing, the retainer having a plurality of circumferentially spaced deflectable legs with axial outer ends spaced from an intermediate shoulder on the bore to form an opening for receiving the annular flange on the conduit therein in locking engagement with the axial ends of the deflectable legs, an inner diameter between opposed axial outer ends of the deflectable legs being a first nominal diameter less than the outer diameter of the radial annular flange on the conduit;
release means, mounted in the bore of the housing in the open end thereof;
means, formed on the release means and coacting with an inward extending flange on the housing, for retaining the release means in the housing; and
the release means including an inner sleeve with a through bore extending therethrough having an inner diameter less than a normal inner diameter between opposed deflectable legs of the retainer;
an outer sleeve integrally joined to the inner sleeve at one end and extending concentrically over the inner sleeve from the one end, the outer sleeve slidably disposed over the tubular end of the housing;
a plurality of fingers projecting axially from one end of the inner sleeve opposite from the one end thereof, the fingers disposed between two adjacent deflectable legs of the retainer;
retainer leg engaging surfaces formed on an end of the inner sleeve between the fingers; and
a user manipulatable surface formed exteriorly on the outer sleeve enabling the user to grasp and slidably urge the release means in a direction into the bore in the housing such that the retaining leg engaging surfaces on the inner sleeve engage and deflect the deflectable legs of the retainer radially outward to a diameter between opposed deflectable legs greater than the outer diameter of the annular flange on the conduit permitting separation of the conduit from the housing.

13. The quick connector of claim 12 further comprising:
a plurality of slots extending axially from the one end to an opposite end of the outer sleeve and dividing the outer sleeve in a plurality of circumferentially spaced outer sleeve sections, each integrally joined at one end to the inner sleeve.

14. The quick connector of claim 13 wherein:
the slots in the outer sleeve are circumferentially aligned with the fingers on the inner sleeve.

15. The quick connector of claim 12 wherein the means for mounting the release means in the housing comprises:
a plurality of radially extending, circumferentially spaced projections formed on the inner sleeve, the projections extending radially outward a distance such that an outer diameter between opposed projections is greater than a diameter of the open end of the bore in the housing.

* * * * *